US010294839B2

(12) United States Patent
Bailey

(10) Patent No.: US 10,294,839 B2
(45) Date of Patent: May 21, 2019

(54) ENGINE EXHAUST EMISSIONS TREATMENT SYSTEM

(71) Applicant: Illinois Valley Holding Company, Downers Grove, IL (US)

(72) Inventor: Brett Bailey, Cape Coral, FL (US)

(73) Assignee: Illinois Valley Holding Company, Downers Grove, IL (US)

( * ) Notice: Subject to any disclaimer, the term of this patent is extended or adjusted under 35 U.S.C. 154(b) by 0 days.

(21) Appl. No.: 15/566,065

(22) PCT Filed: Apr. 11, 2016

(86) PCT No.: PCT/US2016/026895
§ 371 (c)(1),
(2) Date: Oct. 12, 2017

(87) PCT Pub. No.: WO2016/168106
PCT Pub. Date: Oct. 20, 2016

(65) Prior Publication Data
US 2018/0135482 A1 May 17, 2018

Related U.S. Application Data

(60) Provisional application No. 62/146,910, filed on Apr. 13, 2015.

(51) Int. Cl.
*F01N 3/023* (2006.01)
*F01N 3/035* (2006.01)
(Continued)

(52) U.S. Cl.
CPC ............ *F01N 3/035* (2013.01); *F01N 3/021* (2013.01); *F01N 3/0232* (2013.01);
(Continued)

(58) Field of Classification Search
CPC .... F01N 3/0232; F01N 3/0233; F01N 3/0238; F01N 3/2093
See application file for complete search history.

(56) References Cited

U.S. PATENT DOCUMENTS 6,375,695 B2 * 4/2002 Machida ................. F01N 3/023
55/282.3
7,992,382 B2 8/2011 Bailey
(Continued)

FOREIGN PATENT DOCUMENTS

WO 2014025647 2/2014

*Primary Examiner* — Jonathan Matthias
(74) *Attorney, Agent, or Firm* — Miller Canfield

(57) ABSTRACT

An engine system includes a compression ignition diesel engine connected with an aftertreatment system. A source of diesel fuel, which may have a high sulfur content, is fluidly connected to the engine. The aftertreatment system includes a particle trap fluidly positioned between the engine and the tailpipe, and an SCR catalyst fluidly positioned on the particle trap or between the particle trap and the engine. The SCR catalyst is a sulfur tolerant SCR catalyst. A non-thermal particle trap regeneration system includes a valve fluidly positioned between a particulate volume and an inlet to the particle trap. A reductant system has a doser positioned, possibly in the exhaust manifold, to deliver a reductant into the aftertreatment system upstream from the SCR catalyst.

20 Claims, 5 Drawing Sheets

(51) Int. Cl.
*F01N 3/08* (2006.01)
*F01N 3/20* (2006.01)
*F01N 3/021* (2006.01)
*F01N 13/00* (2010.01)

(52) U.S. Cl.
CPC ......... *F01N 3/0233* (2013.01); *F01N 3/0807* (2013.01); *F01N 3/0814* (2013.01); *F01N 3/0842* (2013.01); *F01N 3/2006* (2013.01); *F01N 3/2066* (2013.01); *F01N 13/009* (2014.06); *F01N 13/0097* (2014.06); *F01N 2570/14* (2013.01); *F01N 2900/1602* (2013.01); *Y02A 50/2325* (2018.01); *Y02T 10/24* (2013.01)

(56) References Cited

U.S. PATENT DOCUMENTS

| | | | |
|---|---|---|---|
| 2011/0201493 A1* | 8/2011 | Goto | B01D 46/2429 502/100 |
| 2016/0123945 A1* | 5/2016 | Qi | G01N 33/0037 73/23.31 |
| 2017/0211441 A1* | 7/2017 | Johansen | B01D 46/0068 |
| 2017/0216771 A1* | 8/2017 | Johansen | B01D 46/0068 |

* cited by examiner

ENGINE EXHAUST EMISSIONS TREATMENT SYSTEM

TECHNICAL FIELD

The present invention relates generally to engine systems exhaust after treatment and, more particularly to improved arrangements and catalyst for treating engine exhaust emissions.

BACKGROUND

Internal Combustion engines generally, and compression ignition diesel engines specifically, produce particulate matter which is considered a waste byproduct of combustion and harmful to the environment. Governments around the world have created regulations focused on reducing the level of Particulate Matter (PM) along with Nitrous Oxides (NOx), Unburned Hydrocarbons (UHC) and Carbon Monoxide (CO). Since the formation of NOx is inversely proportional to the particulate matter being created, many technical achievements such as ultra-high fuel injection pressure systems have been developed in order to allow NOx emissions reduction technologies while maintaining or reducing particulate matter emissions. The ultra-high injection pressure (e.g. 30,000 psi or higher) creates better atomization of the fuel so that the limited oxygen available with NOx reducing technologies such as Exhaust Gas Recirculation (EGR) can be utilized for lower engine out NOx while maintaining or reducing particulate matter emissions. While ultra-high injection pressure reduces particulate matter emissions, the parasitic load on the engine is increased along with an increase in engine system cost.

It should be noted that while the particulate mass has dropped, an increase in the number of engine out ultrafine particles increases the health risk of internal combustion engines exhaust. In order to reduce the particulate exiting the tailpipe, the current commercial state of the art engine technology has typically included a Particulate Filter (PF) to trap the particles in the engine's exhaust before being released into the atmosphere. While particulate filters have been commercially available for decades, the technologies for removing the built up particulate matter have had varying degrees of success depending on the operating cycle of the engine. This along with fuel efficiency reductions caused by the filter restriction and regeneration thermal energy, that provides no useable output work, has required government regulations to bring about the main stream commercial availability of the technology.

Commercially available active exhaust treatment systems utilize a particulate filter which is thermally regenerated. Fuel is a convenient source of energy for such regeneration. During active filter regeneration, the exhaust gas temperature can be increased by combusting an additional quantity of fuel in the exhaust system using specialized hardware and using one of the following methods:

Late injection combustion—Fuel is injected later in the expansion stroke so that the lower effective compression ratio produces high exhaust temperatures Flame combustion—the fuel is combusted in a fuel burner, usually with a dedicated supply of combustion air, with the flame entering the exhaust system.

Catalytic combustion—the fuel is introduced through an exhaust injector, evaporated and mixed with exhaust gas, and oxidized over an oxidation catalyst.

Combined flame and catalytic combustion—a combination of the above methods, where a fuel burner is followed by a catalytic combustion system.

Further details can be found in "Filters Regenerated by Fuel Combustion" by W. Addy Majewski. In short, the removed particulate is burned and creates CO2 which is passed into the atmosphere.

The current thermal solutions, described above, are overly complicated, require some method of active thermal regeneration, or require a high exhaust temperature operating cycle for thermal regeneration. These active thermal regeneration technologies utilize additional fuel use for increasing exhaust temperature which does not provide useable output work. The use of fuel, without subsequent output work, does not comply with the current global concern for Green House Gas, (GHG) Carbon Dioxide ($CO_2$) emissions or the end user concerns over high fuel prices (operating costs). In addition to utilizing fuel, the current systems require sophisticated control algorithms, sensors, burners or dosing systems, and typically utilize finitely available and costly rare earth elements. The sustainability of such technologies is in question. U.S. Pat. No. 7,992,382 describes using a back flow of filtered exhaust gases to regenerate the filter non-thermally. Utilization of the arrangement does not improve the NOx effectiveness of the catalyzed SCR systems.

To reduce NOx emissions, the current approach is to place a Selective Catalytic Reduction, (SCR) in the exhaust system to reduce the NOx to Nitrogen and water. This requires exhaust temperatures ranges that do not cover the entire engine operating range and do not operate effectively until they have reached temperatures above their light off temperature. Since these technologies require elevated operating temperatures typically above 250 degrees Celsius, they do not perform at start up or during low temperature stop and go urban operation. This problem is exacerbated due to current active thermal PF regeneration technologies needing partial passive regeneration to keep the fuel used for active regeneration and subsequent overall brake specific fuel consumption (BSFC) to a minimum. The current approach for passive regeneration is to use $NO_2$ which was converted from NOx by the rare earth metals in the Oxidation Catalyst (DOC). Since NOx is only present, in sufficient quantity, before the SCR, the PF must be placed upstream of the SCR for passive thermal regeneration by $NO_2$ to occur. The upstream position of the PF creates a heat sink in the system and reduces the rate at which the downstream SCR temperature is ramped up during startup and urban drive cycles. These first few minutes significantly contribute to the overall cycle emissions of the vehicle subsequently requiring aftertreatment that is typically greater than 90% efficient. The current high NOx effectiveness requirement, along with the removal of costly precious metals utilized in lean NOx traps, has made SCR the main technology for mobile and stationary engines.

The current active thermal system approach has added additional constraints to the SCR catalyst that can be implemented, due to the high temperature durability concerns for SCR catalyst such as Vanadium Pentoxide. Copper Zeolite catalysts are currently utilized for SCR solutions that include thermal regeneration, while operating with ultra-low sulfur fuels, due to the catalyst's high temperature capability and reasonable sulfur tolerance to this low level of fuel sulfur. Copper zeolite catalyst, even while utilizing ultra-low sulfur (<15 ppm) fuels, require a rich air/fuel ratio sulfur regeneration event to desorb the sulfur utilizing greater than 700° Celsius temperatures. This periodic sulfur desorption regeneration requires a method of attaining a high temperature in the SCR, whether it be an oxy-cat or full burner regeneration in order to retain their performance. The regeneration requirement adds cost and complexity to the system and reduces the engine's overall thermal efficiency. Additionally, the use of exhaust energy recovery systems, are constrained by the maximum temperature required for this regeneration event to occur. The elimination of this thermal desulfation event would be a desired thermal efficiency improvement.

Additionally, the close-coupled nature of current catalyst arrangements limit the residence time for complete urea hydrolysis making the potential for urea deposits on the catalyzed PF substrate and exhaust piping. The depositing of the urea on the particulate filter has been shown to have additional adverse effect on the NOx effectiveness after aging. In order to attain ultra-low emissions at temperatures below 200 degrees Celsius, the use of a static mixer, advanced injectors, or an increase in the distance between the injection site and the catalyst is required. Hydrolysis requires temperature and time in order to be completed. Increased distance between the urea injection site and the SCR catalyst will further improve the effectiveness of the urea hydrolysis without adding complexity to the system by means of high urea injection pressures or the aforementioned static mixer.

Thermal aging of SCR systems is a known problem that is significantly increased by the active thermal regeneration of the particulate filter and sulfur desorption and one that requires an oversized substrate or additional catalyst material in order to achieve acceptable aged catalyst state NOx effectiveness. Additional catalyst, in the coating, increases the backpressure created by the substrate along with additional cost. While catalyst companies have been attempting to achieve higher temperatures with vanadium pentoxide catalyst, their operation still does not have the thermal durability to withstand the high temperature requirements of thermal regeneration compared to copper zeolite. The removal of high temperature regeneration for longer aftertreatment life, low temperature NOx effective catalyst, and exhaust energy recovery is desired.

The ash accumulation, in thermal systems, that utilize a separate PF, also reduces the effectiveness of passive regeneration and increases the backpressure on the engine. The coating of the SCR catalyst on the PF substrate creates the additional performance reduction in NOx effectiveness as ash is accumulated. Since the ash accumulates near the end of the substrate, the flow of exhaust gases is reduced and then completely blocked. The reduction in flow area reduces the effective catalyst surface area/sites available resulting in reduced NOx effectiveness and passive regeneration while increasing the backpressure. Ash removal on a continuous or increase frequency is desired so as to keep this area active and functioning.

Additionally, the ability to combine multiple aftertreatment modules into a single unit, without sacrificing NOx effectiveness or higher backpressure, requires very high porosity PF substrates. As the porosity is increased, the durability of the substrate is reduced by the high thermal regeneration temperatures and the thermal gradients imposed during the quick ramping up and down of the temperature between normal operating exhaust temperature and the required regeneration temperature set point. The removal of high temperature regeneration allows significant increases in particulate filter substrate porosity. This increase in porosity gives the required volume for additional catalyst and improved NOx effectiveness without an increase in backpressure.

The use of a separate flow through SCR substrate downstream of the SCR catalyst coated PF has been shown, by catalyst company BASF, to increase the NOx performance by over 5% with a 50% increase in the substrate volume. Increased porosity, higher catalyst loading, and oversized substrates provide the similar benefit of increased effectiveness compared to the state-of-the-art would be desired. Particulate filters with a length to diameter ratio greater than 1.3 have been known to be damaged by excessive temperatures at the end of the filter.

In addition to the SCR solution, it has been shown in the prior art that the use of a Passive NOx Adsorber (PNA) can trap NOx as it exits the engine under low temperature operation and then release the NOx as the temperature climbs in operating temperature. Current PNA literature states that desorption of the NOx occurs before current copper zeolite or iron zeolite based metal catalyst are capable of significant NOx reduction effectiveness. For current designs to properly function with a PNA, the PNA needs to begin desorption at 175 degrees Celsius or higher along with the close coupling of the SCR to the PNA, or alternately a SCR capable of significant NOx reduction down to 150 degrees Celsius.

Stationary engines have long utilized a formula of vanadium pentoxide that functions well at temperature ranges between 100 degrees and 350 degrees Celsius. The lower temperature range functions very well for stationary engines where the exhaust temperature is held within a limited range of temperature. The high end of the temperature range does not correspond to the mobile market where exhaust temperatures, near the engine, can reach in excess of 450 degrees Celsius. Since maximum temperature, within the aftertreatment system, is closely linked to the location of the device to the engine, as the distance from the engine increases, radiant and convective heat losses reduce the peak temperature obtained. The aftertreatment industry has focused on the reduction of the distance between the aftertreatment and the engine in order to achieve higher temperatures in the quickest time possible. The placement of the aftertreatment near the engine has been termed close-coupled by the industry. To utilize low temperature SCR catalysts, such as the stationary vanadium pentoxide formula, the opposite must be attained. The further that the device can be positioned away from the engine, the lower the peak temperature. The exhaust temperature near the end of the exhaust system has shown to be a maximum of 203 degrees Celsius without a thermal regenerated PF compared to 418 degrees Celsius during an active thermal regeneration event. In addition to the maximum effective operating temperature constraint of around 350 degrees Celsius for the low temperature SCR catalyst, the ability to inject urea into the exhaust is limited to a temperature high enough for hydrolysis and proper mixing to be completed. The utilization of a PNA near the engine or within the SCR well downstream of the engine allows for the storage of NOx while the engine exhaust, after the PNA, reaches the threshold where the urea can be injected. Further, the increased length between the urea injection site and the SCR substrate improves the NOx reduction effectiveness by allowing for complete hydrolysis and mixing with the exhaust gases before becoming in contact with the SCR catalyst.

Current aftertreatment systems, depending on the countries emissions regulation, further require a particulate filter, to be installed, in order to meet stringent particulate matter mass and number emissions. Since these systems currently utilize a thermal high temperature regeneration to oxidize the particulate matter, temperatures above 500 degrees Celsius are typically generated that would deactivate and damage the low temperature stationary and mobile vanadium $V_2O_5$ catalyst formulas. Assisted passive regeneration increases the temperature to a level where passive regeneration can be completed, but this approach is only utilized with systems that utilize significant passive regeneration. In order to keep the temperatures below the SCR temperature constraint, the active thermal regeneration would be required to operate downstream of the low temperature SCR catalyst. Increasing the temperature from a level below the SCR threshold to above the temperature required for carbon oxidation with oxygen would require significant additional fuel. The fuel would be oxidized utilizing a downstream oxy-cat or a fuel burner to provide the high temperatures further decreasing the overall thermal efficiency of the engine. Another potential method would be to place the PF near the engine and actively cool the exhaust or bypass the exhaust around the filter. Cooling the exhaust from these thermal regeneration temperatures to a point where effective SCR NOx reduction can occur would require a cooling system that would require too much packaging space and excessive cost. Another approach would be to bypass the low temperature catalyst at high temperatures. In order to bypass the filter during thermal regeneration without allowing NOx to be released to the environment, the filter would have to additionally be coated with a high temperature SCR catalyst and a separate urea injector installed. The increased complexity of the second sulfur intolerant SCR catalyst and urea injection site would also increase the cost and complexity of the system beyond what the market will bear. Thus, the industry has no answer in order to attain an overlapping operation of the PNA desorption and high SCR effectiveness while providing effective and efficient particulate matter regeneration. Passive regeneration is only possible in applications where the particulate matter generated is lower than the engine's passive regeneration level. Since many applications operate at low temperatures below that required for passive regeneration, an active system is still required for the remaining applications.

In the Illinois Valley Holding Company application PCT_US_053456 (WO 2014025647 A3), a throttle valve is utilized to create a pressure below that of atmospheric conditions within a particulate settling volume. While this approach alters how the differential pressure is attained, the system does not provide SCR NOx reduction capabilities but is a strategy for non-thermal regeneration of the PF.

A global solution, that has high sulfur tolerance with no increase in system temperature during regeneration, is needed so that the development costs can be shared between all markets. Additionally, as vehicles and engines are typically shipped/transferred, during the engine/vehicles useable life, from developed countries to developing countries, the aftertreatment system should be capable of operating on high sulfur fuel. Improved resale value along with the environmental advantages of the engine retaining the original ultra-low emissions will have significant global emissions reduction significance. This global issue is becoming ever more important as the engine mapping for high efficiency and subsequent high engine out NOx output is requiring high aftertreatment emissions reduction effectiveness and subsequent high emitting emissions levels if the system becomes less effective. If the aftertreatment system is not removed and modifications to the Electronic Control Module (ECM) are completed, then the aftertreatment will be poisoned by the higher sulfur level in the developing country's fuel. The NOx emissions, in particular, will be significantly higher than internal combustion engines produced even a decade ago.

Engine aftertreatment has allowed ultra-low emissions even with high engine out emissions. The addition of aftertreatment has reduced the need for sophisticated engine combustion systems. The advantages of high pressure fuel injection for the reduction in particulate matter are reduced if the particulate filter regeneration system is efficient. The SCR catalyst NOx reduction effectiveness allows the advancement of fuel injection timing to further assist in the mixing of low pressure injected fuel and air allowing improved combustion efficiency, complete combustion, and thermally efficient engine performance. The ability to operate with increased engine out particulate levels so as to utilize lower pressure and cost fuel injection systems while still achieving NOx and PM emissions is desired. Engine performance and drivability are enhanced by increasing particulate matter generated by the engine during accelerations. Rich air/fuel ratios allow for increased power output, reducing the need for variable geometry turbochargers and their associated expense. Achieving low emissions with a low cost engine and aftertreatment system lowers the financial barrier to entry into developing markets.

The present invention is directed toward overcoming one or more of these deficiencies of the prior art.

SUMMARY

In one aspect, an engine system includes a compression ignition diesel engine with an exhaust outlet fluidly connected with an aftertreatment system that terminates at a tailpipe. A source of diesel fuel is fluidly connected to the engine. The aftertreatment system includes a particle trap fluidly positioned between the engine and the tailpipe, and a SCR catalyst fluidly positioned on the particle trap or between the particle trap and the engine. The SCR catalyst is a sulfur tolerant SCR catalyst. A non-thermal particle trap regeneration system includes a valve fluidly positioned between a particulate settling volume and an inlet of the particle trap. A reductant system include a doser positioned to deliver a reductant into the aftertreatment system upstream from the SCR catalyst.

In another aspect, a method of operating the engine system includes rapidly heating the SCR catalyst faster than the particle trap immediately after the engine start up. A reduction reaction of the NOx with the reductant is catalyzed with the sulfur tolerant SCR catalyst. Particulate matter generated by burning diesel fuel in the compression ignition diesel engine is trapped in the particle trap. The particle trap is regenerated by moving the particulate matter from within the particle trap, out through the inlet of the particle trap, through the valve and into the particulate settling volume.

DETAILED DESCRIPTION

Figure 1:
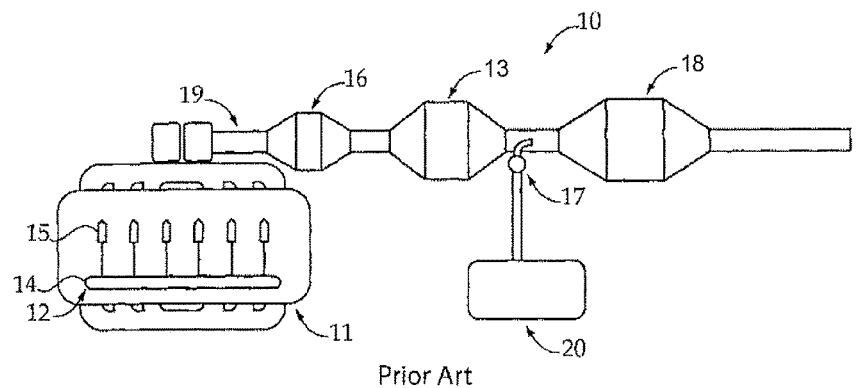
FIG. 1 is a diagrammatic illustration of a system embodying the prior art approach for operating an internal combustion engine utilizing a passive and active thermal Particulate Filter (PF) regeneration along with a Selective Catalytic Reduction (SCR) for reducing the engine's NOx emissions.

A prior art engine system 10 is shown in FIG. 1 which illustrates a Selective Catalytic Reduction (SCR) 13 is placed upstream of Particulate Filter (PF) 18 for simultaneously reducing the Nitrous Oxide (NOx) and Particulate Matter (PM) from an internal combustion engine 11. Engine 11 is a compression ignition diesel engine equipped with a high pressure (>15,000 psi injection pressure) common rail fuel system 12 that includes a common rail 14 and a plurality of electronically controlled fuel injectors 15. Advanced injection timing produces NOx emissions with considerable NO, and after coming in contact with the expensive rare earth elements in Oxidation Catalyst (OC) 16 a portion is converted into NO2. Since NO2 is less stable than NO or NO3, if the temperature is above ~350 degrees Celsius, the NO2 will react with the stored soot in PF 13 oxidizing the particulate matter into CO2. If the operating temperature is below ~350 degrees Celsius, the particulate remains stored in the filter 13 and is required to be cleaned by many different thermal methods including, for example, late injection of fuel into the cylinder of engine 11 to increase the exhaust temperature typically well above the ~250 degrees Celsius oxidation point where at least passive catalyzed passive regeneration is capable of taking place. Downstream of the PF 13, an urea injector 17 sprays urea from urea tank 20 into an exhaust pipe 19 ahead of a SCR 13, which is typically a sulfur intolerant predominantly copper zeolite catalyst. The Nitrous Oxide (NOx), in the form of NO, NO2, and NO3, then flows, in combination with the urea, that through hydrolysis has been transformed into ammonia, through the SCR 13 converting the nitrous oxide into nitrogen and water before exiting the tailpipe.

Figure 2:
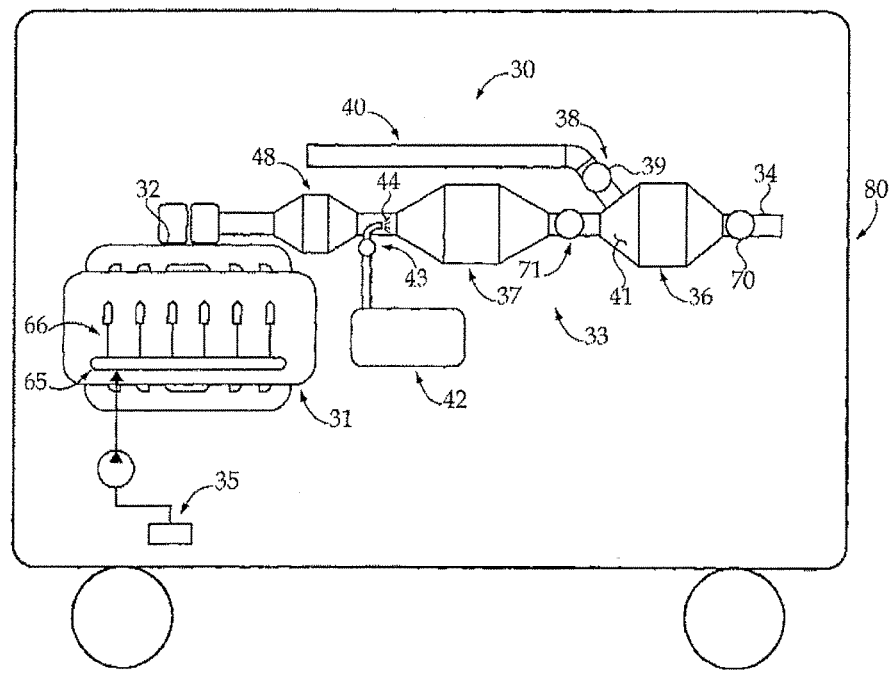
FIG. 2 is a diagrammatic illustration of a first embodiment in which a non-thermal actively regenerated PF is downstream of the SCR.

FIG. 2 illustrates an improvement on the state-of-the-art by reversing the order of the SCR 37 and the PF 36 thereby reducing the thermal mass ahead of the SCR 37. While this arrangement removes the ability to passively regenerate utilizing $NO_2$, this arrangement reduces the time required for SCR 37 catalyst to become effective. The time is reduced by the thermal mass and subsequent heat sink of the particulate filter 36 being located downstream from SCR 37. The quicker light off of the SCR 37 allows for lower amounts of Exhaust Gas Recirculation, (EGR) which is known to increase particulate generation especially during cold start up conditions.

In the embodiments of FIGS. 2 thru 10 and 13, the regeneration of the PF is a non-thermal particle trap regeneration system 38, such as that described in U.S. Pat. No. 7,992,382 assigned to Illinois Valley Holding Company in which regeneration is achieved via the reverse-flow of filtered exhaust gas disclosed in that patent. Throughout this disclosure the same number is used to identify a same or equivalent thing. Such regeneration is instituted by closing valve 70 which may be an exhaust brake configuration or a simple on/off valve, and closing normally open valve 71. The reverse flow goes back through the filter of the PF 36 and is directed by opening a normally closed valve 39 into a particulate volume 40 such as the pipe shown in FIGS. 2, 3, 4, 8, 9, 10, and 13 or other components as shown in said patent. Particulate volume 40 may be a settling volume, an agitated volume or even a conduit for moving the particulate matter back into the engine for burning therein. In this non-thermal method of regeneration, the regeneration of the PF 36 is ultra-efficient and operation utilizing regenerative braking forces allows for active regeneration without any decrease in the fuel economy and without oxidizing the particulate matter.

Starting of engine 31 creates exhaust flow and a ramped increase in exhaust temperature. Since the SCR 37 is now the first catalyzed aftertreatment, the unit heats up first allowing the unit to reach the light off temperature in a shorter period of time. Catalyst "light off" is the temperature where SCR catalyst can begin NOx emissions reduction. Emissions testing is a measurement of an emission total, so the quicker the catalyst comes up to temperature the less emissions reduction will have to be performed after the catalyst begins operating and still satisfy the relevant emissions regulation. SCR technology is typically over 90% effective. Operation at lower temperatures will allow this percentage to further increase towards an overall 95% or greater NOx reduction at tailpipe 34.

One skilled in the art will recognize that an exhaust gas recirculation (EGR) is ordinarily utilized with the SCR for low temperature engine out NOx reduction along with achieving ultra-low tailpipe NOx emissions. In the hereafter disclosed arrangements, the efficiency of the SCR is raised so that the need for EGR is reduced or even precluded for some uses. Once again, this is because the effective operating temperature of the SCR is reached more quickly and retained at lower engine loads more effectively with the disclosed arrangements.

Figure 3:
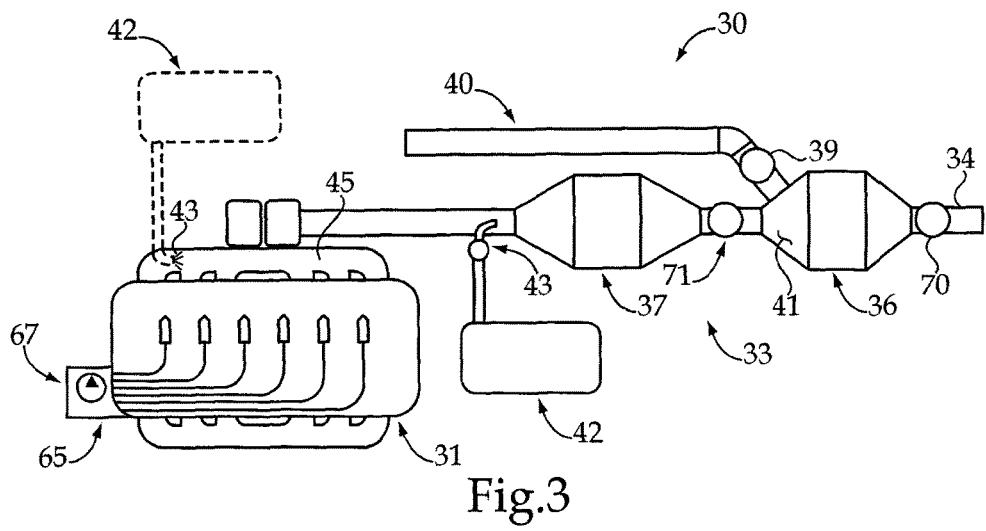
FIG. 3 is a diagrammatic illustration of a second embodiment similar to FIG. 2 but without an Oxidation Catalyst (OC)

FIGS. 2 and 3 illustrate embodiments in which a non-thermal actively regenerated PF 36 is located downstream of the SCR 37. In this arrangement, engine exhaust gases first enter, and are treated by, the SCR 37. Hence the SCR 37 substrate receives the exhaust when the exhaust is at a higher temperature so it is heated more quickly with attendant more effective utilization. Likewise, the PF 36 is further spaced from the engine 31 and receives the exhaust after some heat has been removed. Since the filter in the PF 36 is a non-thermal regenerative type, the OC 48, SCR 37 and PF 36 are not exposed to high thermal temperatures required to burn the accumulated particulate in PF 36. The downstream location of PF 36 together with the removal of thermal regeneration leads to less thermal gradients and results in longer life for the entire system. The removal of passive thermal regeneration and subsequent temperature increase generated by oxidizing fuel with a catalyst required in some thermal regeneration methods leads to the potential removal of OC 24, as shown in FIG. 3. This is dependent on the SCR catalyst chosen since many SCR catalyst, including Vanadium Pentoxide, are more effective with a 1:1 ratio of NO2 to NO. The NO2 is generated by the OC 24 creates what is termed the fast NOx reaction. A fast NOx reaction improves NOx effectiveness at lower engine exhaust temperatures but can be detrimental to NOx reduction at higher engine loads. Higher operating condition engines require less OC 48 catalyst allowing it to be coated on PF 36. The amount of catalyst utilized would be in the amount required to remove CO and any additional HC emissions not removed by the SCR. Since vanadium pentoxide is known to oxidize hydrocarbon emissions, the OC 48 may be eliminated except where strict emissions regulations require CO and HC reduction effectiveness. The added benefit of vanadium pentoxide is the sulfur tolerance allowing operation on high sulfur (>15 ppm) fuel typically used in developing countries. It should be noted that if a copper zeolite catalyst were utilized in the arrangement depicted in FIG. 2, high temperature regeneration would be required for the desorption of sulfur from the copper zeolite catalyst. The required desorption temperature might be attained utilizing an oxy-cat thermal system utilizing OC 48 for the oxidation and temperature increase by oxidation of hydrocarbons added by either the engine 31 electronic control module or a separate burner (not shown) upstream of the OC 48, urea injector 43, or SCR 37. As used in this disclosure, a "sulfur tolerant SCR catalyst" is one that can tolerate exhaust chemistry associated with burning of diesel fuel with a sulfur content greater than 15 parts per million of sulfur. Thus, vanadium pentoxide would be considered a sulfur tolerant SCR catalyst according to the present disclosure, but copper zeolite would not.

Returning to FIG. 2, engine system 30 may be supported on, and operably coupled to propel, a mobile vehicle 80. In fact, any of the disclosed embodiments could likewise be supported on, and operably coupled to propel, a mobile vehicle without departing from the present disclosure. Engine system 30 includes a compression ignition diesel engine 31 with an exhaust outlet 32 fluidly connected with an after treatment system 33 that terminates at a tailpipe 34. A source of diesel fuel 35 is fluidly connected to the engine 31. The after treatment system 33 includes a particle trap or filter 36 fluidly positioned between the engine 31 and the tail pipe 34. A SCR catalyst 37 is positioned between the particle trap 36 and the engine 31. The SCR catalyst is a sulfur tolerant SCR catalyst. A non-thermal particle trap regeneration system 38 includes a valve 39 fluidly positioned between a particulate settling volume 40 and an inlet 41 of particle trap 36. A reductant system 42 includes a doser or injector 43 positioned to deliver a reductant 44, such as urea, into the after treatment system 33 upstream from the SCR catalyst 37. In the illustrated embodiment, the sulfur tolerant SCR catalyst 37 is predominantly vanadium pentoxide. The source of diesel fuel 35 may have a sulfur content greater than 15 parts per million. Engine 31 may include a low pressure fuel injection system 65, such as a common rail fuel injection system 66 with a maximum injection pressure less than 15,000 psi.

Referring to FIG. 3, engine system 30 is similar to that of the embodiment of FIG. 2 except that the low pressure fuel injection system 65 takes the form of a pump and line fuel injection system 67 and oxidation catalyst 48 of FIG. 2 is omitted. Otherwise, the engine system 30 is substantially similar to that of FIG. 2. However, FIG. 3 also shows in dotted lines the reductant system 42 with a doser 43 that opens into the exhaust manifold 45 of the compression ignition diesel engine 31. This strategy may allow for even quicker treatment of NOx produced by engine 31 immediately after cold start.

Figure 4:
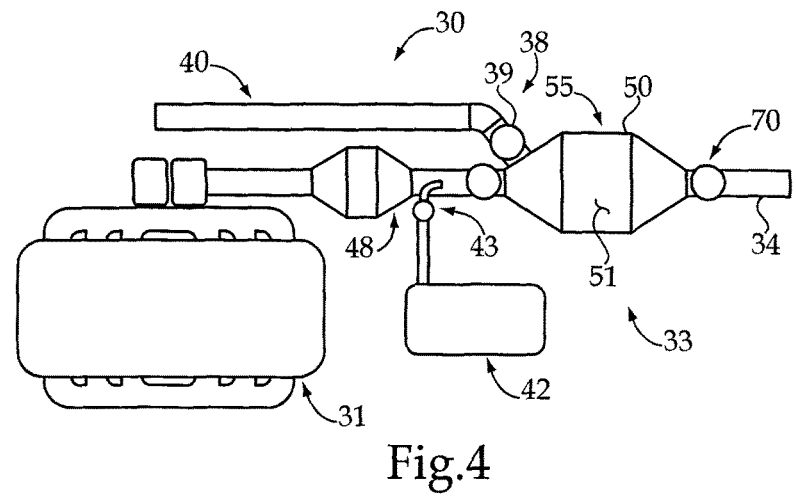
FIG. 4 is a diagrammatic illustration of another embodiment of a non-thermal active regeneration arrangement in which the SCR catalytic material is coated directly on the PF substrate.

FIG. 4 illustrates an embodiment in which a non-thermal active regeneration arrangement 38, as described above in conjunction with FIG. 2, but in which the SCR catalytic material is coated directly on the inlet channel, outlet channel, within the wall, or any catalytic coating combination of the PF substrate thereby combining the SCR NOx-reduction function with that of the PF. Increased NOx reduction effectiveness is achieved with the SCR catalyst coated on the entire substrate 51. In this manner, a separate SCR substrate as the FIGS. 2 and 3 can be eliminated. The elimination of a separate SCR substrate can greatly improve the packaging flexibility and cost of the after treatment system. In other words, FIG. 4 shows a combined particle trap/SCR catalyst 55 that are positioned within a shared can 50. The embodiment of FIG. 4 is similar to that of FIG. 2 in that an oxidation catalyst 48 is positioned between reductant system 42 and engine 31. Although not shown, compression ignition diesel engine 31 may be equipped with a low pressure fuel injection system, which may be a common rail system 66 as shown in FIG. 2 or maybe a pump and line system 67 as shown in FIG. 3. In any event, a low pressure fuel injection system according to the present disclosure means a system that directly injects fuel into the individual cylinders at an injection pressure less than 15,000 PSI. Those skilled in the art will appreciate that modern trends tend to ever higher injection pressures, which now regularly exceed 30,000 PSI. All of the other disclosed embodiments may also utilize a low pressure fuel injection system.

Figure 5:
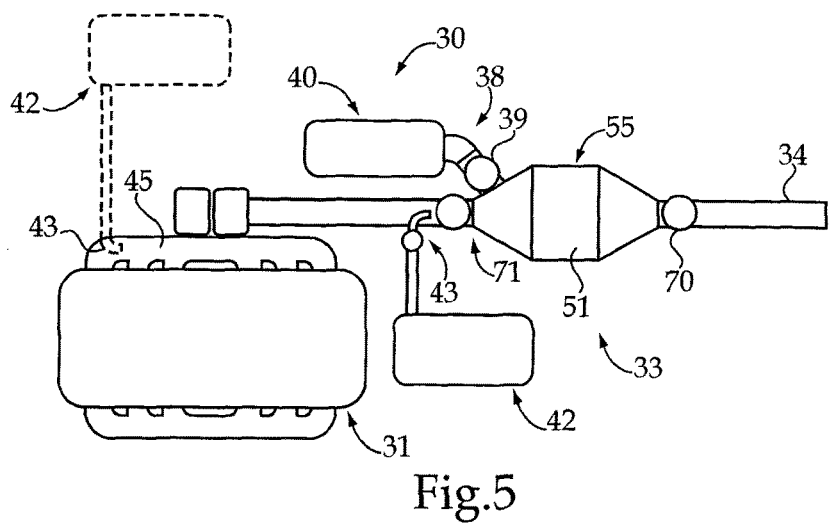
FIG. 5 is a diagrammatic illustration of still another embodiment similar to FIG. 4 but without a Oxidation Catalyst (OC)

FIG. 5 is similar to FIG. 4 but with the oxidation catalyst also eliminated (see OC 48 in FIGS. 2 and 4). Elimination of the oxidation catalyst in the embodiment of FIG. 5 may permit moving the reductant system 42 so that the doser 43 is positioned to open and deliver reductant, such as urea, directly into the exhaust manifold 45 of engine 31. This may permit the reductant system 42 to become effective sooner after cold start as the higher temperatures in the exhaust manifold may permit earlier transformation of the reductant to available ammonia after injection into after treatment system 30 when entering at the exhaust manifold 45, rather than somewhere downstream in the after treatment system 30. Although not necessary, a portion of the substrate 51 for the combined SCR/PF 55 may be coated with a suitable oxidation catalyst for oxidizing some hydrocarbons and carbon monoxide present in the exhaust stream. Hence multiple catalysts may be coated on the SCR/PF 55 substrate 51 of FIG. 5.

Figure 6:
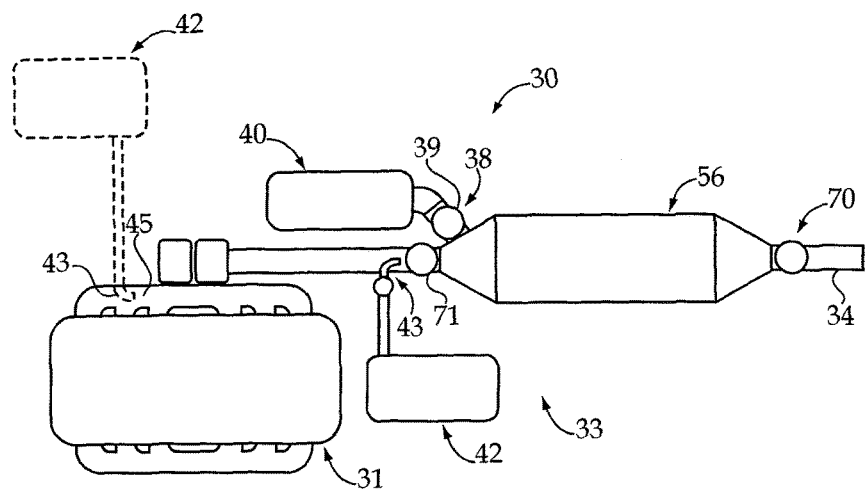
FIG. 6 is a diagrammatic illustration of still another embodiment similar to FIG. 5 but with an oversized PF.

FIG. 6 is similar to FIG. 5, but with an oversized combined substrate SCR/PF 56, with a substrate having a length over diameter ratio greater than one and a half. Those skilled in the art will appreciate that thermally regenerated particle traps are generally limited to a length over diameter ratio on the order of about one or less, because larger L/D ratios can lead to increased temperature gradients that result in cracking or melting of the substrate. Like the embodiment of FIG. 5, the elimination of the oxidation catalyst of FIG. 4 may again permit the reductant system 42 to move upstream, such as locating the doser 43 for injection of urea into the exhaust manifold 45 for quicker NOx reduction after cold engine start. The oversized substrate lowers engine backpressure, improves NOx effectiveness by lowering the space velocity, and reduces ammonia slip. The oversizing of the SCR/PF 56 substrate is made possible, by the removal of thermal regeneration and the thermal gradients and subsequent stresses imposed by such regeneration. In particular, the length to diameter ratio is increased for improved packaging, such as under the floor of a vehicle 80 with improved vehicle ground clearance.

Figure 7:
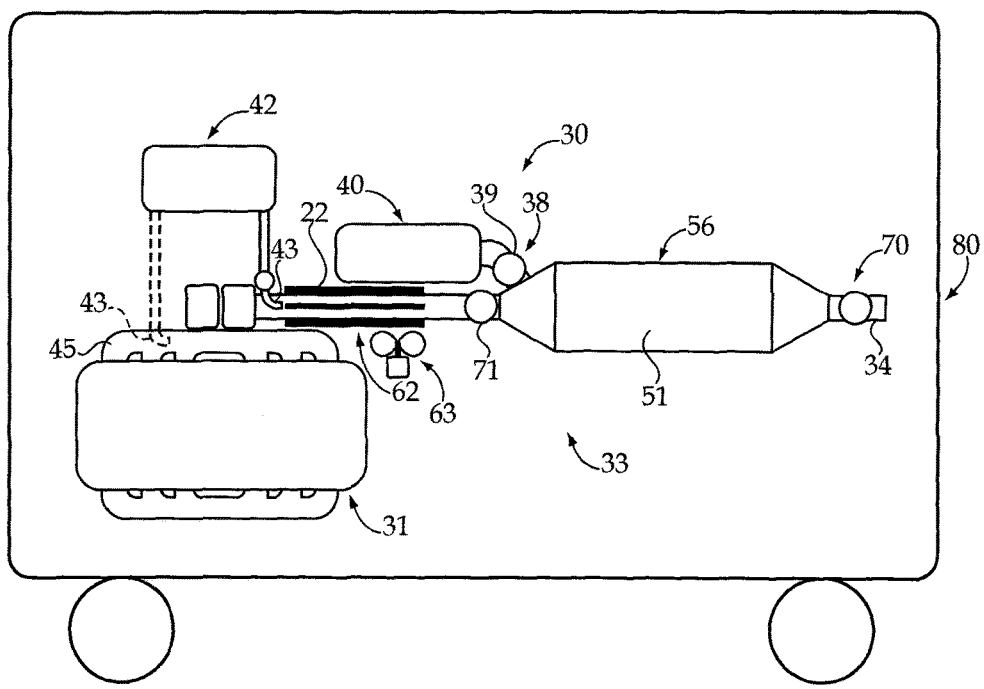
FIG. 7 is a diagrammatic illustration of still another embodiment similar to FIG. 6 but with optional passive and active cooling of the exhaust.

FIG. 7 is similar to FIGS. 4, 5, and 6 but the stationary vanadium pentoxide $V_2O_5$ catalysts formulas, historically utilized in stationary engines, are utilized in the combined SCR/PF 56. These catalysts are often less effective and can be permanently damaged under high engine load operation. As in the previous embodiment, the elimination of the oxidation catalyst may permit the reductant system 42 to locate the doser 43 for injection of reductant into the exhaust manifold 45. As in the embodiment of FIG. 6, the combined SCR/PF 56 may have a length to diameter ratio greater than one and a half to further improve efficiency and reduce back pressure on engine 31. The larger L/D ratio permits effective NOx reduction at slower reaction rates.

The exhaust can be actively or passively cooled in order to lower the maximum exhaust temperature below the level that thermal damage will occur. This may be achieved by increasing the distance, relative to the engine 31, for increased radiant and convective cooling or by active cooling methods. If an increased distance cannot be achieved due to packaging constraints, a method of cooling the engine's exhaust may be utilized. The use of passive cooling fins 62 exposed on an outer surface on the exhaust pipe 22, active cooling by fans 63, or a combination of passive fins 62 and active fans 63 cooling, such as an electrical or mechanical fan 63, to cool the exhaust gases under high load may be utilized. The use of passive cooling with fins 62 only has the inherent advantage of passively altering the cooling under high vehicle speeds while reducing the cooling effect during urban driving where the temperature of the exhaust should not drop below where urea can be injected with complete hydrolysis and without condensing and forming deposits on the substrate 51 or exhaust piping 22. The increased length between the urea injection site, which preferably upstream of the cooling system and maybe in the exhaust manifold 45, creates improved mixing and more complete hydrolysis of the urea prior to coming into contact with the SCR catalyst further improving system NOx effectiveness and durability.

Figure 8:
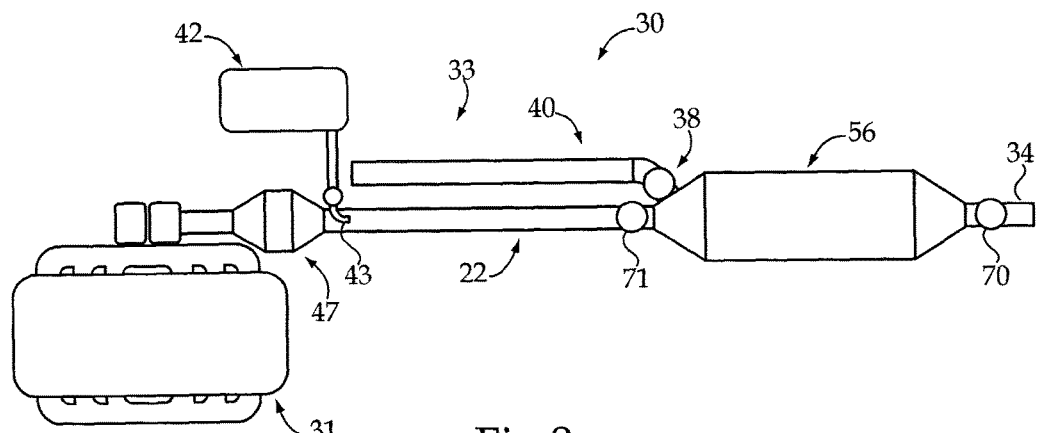
FIG. 8 is a diagrammatic illustration of still another embodiment similar to FIG. 7 but with a Passive NOx Adsorber ahead of the SCR/PF combination.

FIG. 8 is similar to FIG. 7, but with the addition of a separate Passive NOx Adsorber 47, PNA catalyst applied. The PNA 47 adsorbs NOx emissions during engine start up when the temperatures are below the level required for effective SCR operation. The combined oversized SCR/PF 56 has the advantage of reaching the light off point of the catalyst at a temperature level that corresponds to the release of the NOx (desorption) from the PNA 47. This arrangement allows the PNA 47 and SCR/PF 56 to be placed further away from the engine lowering the maximum temperature that the SCR/PF 56 catalyst will be subjected to due to radiant and convective heat release from the exhaust pipe 22. The reduced temperature will ensure that the low temperature $V_2O_5$ SCR catalyst is not damaged while further improving the durability and reliability of the entire exhaust aftertreatment system 33.

Figure 9:
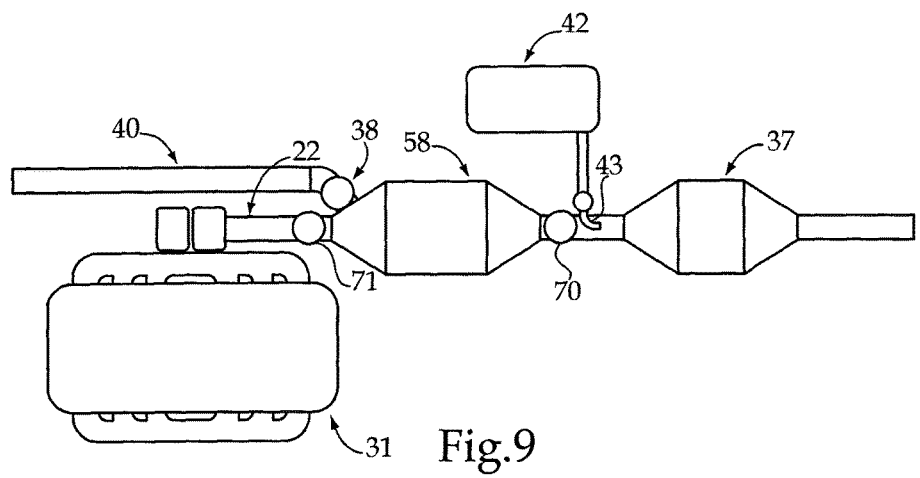
FIG. 9 is a diagrammatic illustration of still another embodiment similar to FIG. 5, 6, 7, or 8 but with the Passive NOx Adsorber, PNA catalyst coated directly on the PF with a downstream urea injector and SCR.

FIG. 9 shows a Passive NOx Adsorber, PNA or similar catalyst coating is added to the PF 58. The PNA/PF 58 will adsorb the NOx during cold start and low temperature operation and then release the stored NOx as the temperature rises to the point where the downstream SCR 37 catalyst is at operating temperature.

Figure 10:
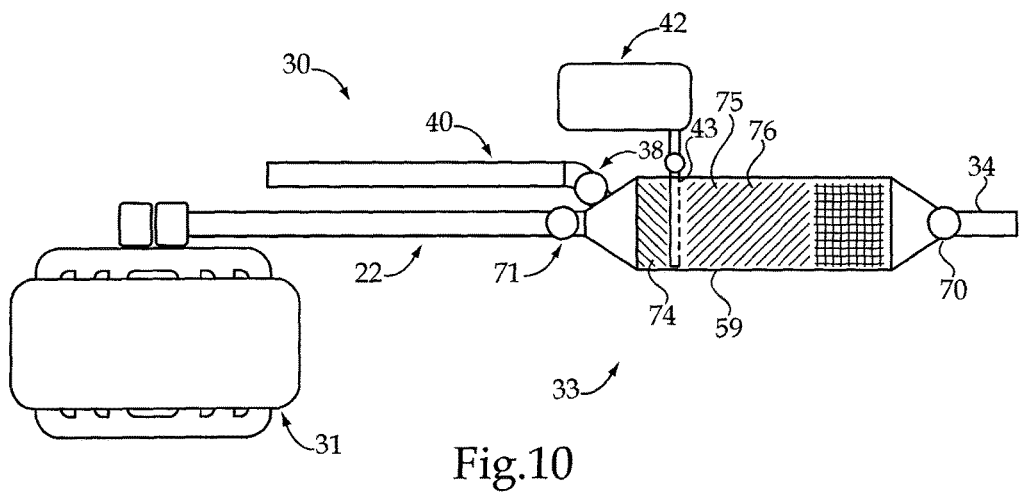
FIG. 10 is a diagrammatic illustration of still another embodiment similar to FIG. 5, 6, 7, or 8 but with the Passive NOx Adsorber, PNA catalyst coated directly on a high porosity and/or inlet membrane with extreme porosity PF.

FIG. 10 is still another embodiment similar to FIG. 8 but with an oversized and sequential PNA/OC/SCR/PF 49. The oversizing of the PF substrate(s) in a single can enable more than one catalyst to be coated on the PF substrate. The first segment 74 of the PF, preferably a portion of the single PF substrate, is coated with a PNA catalyst on both sides of the filter. The second portion 75 of the substrate filter incorporates the low temperature $V_2O_5$ SCR catalyst. With this embodiment the third portion 76 may be an ammonia slip and CO catalyst coating or added as a fourth segment for simplified urea injection controls. The use of a low pressure fuel injection system 65 (FIGS. 2 and 3) in engine 31 is possible, in this and the other embodiments (FIGS. 2-9), due to the effective NOx reduction by the SCR catalyst and efficient non-thermal particulate matter regeneration/cleaning of the PF substrate 74, 75, 76.

Figure 11:
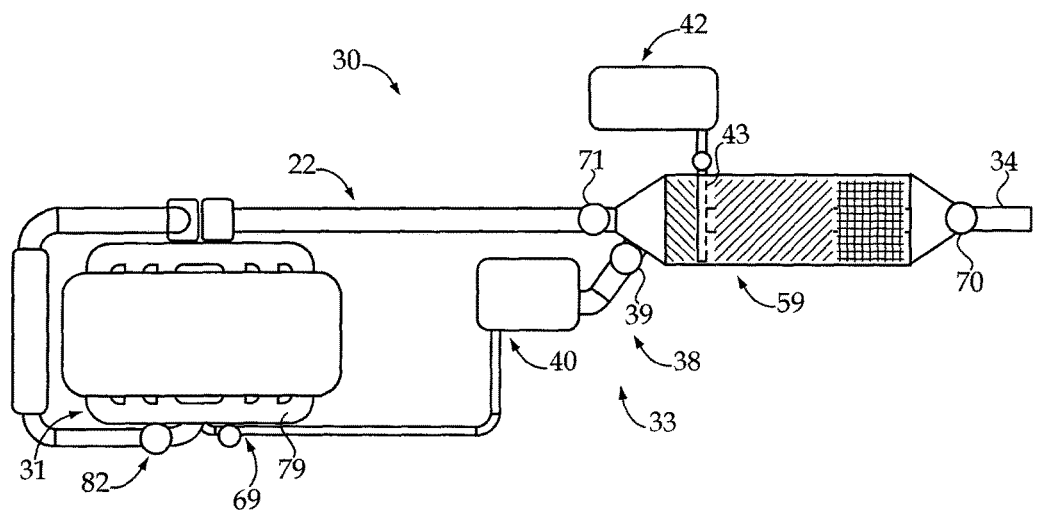
FIG. 11 is a diagrammatic illustration of still another embodiment similar to FIG. 5, 6, 7, 8, 9, or 10 but with the PNA/DOC/SCR/DPR combination operating with a throttle generated non-thermal active regeneration approach.

FIG. 11 is a diagrammatic illustration of still another embodiment similar to FIG. 10 but with the single can PNA/DOC/SCR/PF 59 combination operating with a throttle generated non-thermal active regeneration approach. The regeneration is completed by creating a partial vacuum in settling volume 40 by closing throttle valve 82, in the engine's intake manifold 79 allowing exhaust gases to be drawn through the one-way check valve 69. Regeneration would take place on the opening of valve 39 or a combination of increased exhaust pressure can be accomplished by closing valve 70 at the time valve 82 is closed. The regeneration can be further enhanced by closing valve 71 before the opening of valve 39. Valve 71 isolates the upstream volume of exhaust gases completing with the cleaned exhaust gases reversed flow that induces the non-thermal reverse depression wave. Like the embodiment of FIG. 10, the combined passive NOx adsorber/oxidation catalyst/SCR/PF 59 may be segmented and separately coated as described with regard to the embodiment of FIG. 10. FIG. 11 is also of interest for showing the alternative non-thermal regeneration system 38 for regenerating the filter substrate(s) with the reverse pressure generated in a different manner. Those skilled in the art will appreciate that this non-thermal regeneration strategy may be substituted in place of or an enhancement of non-thermal regeneration system 38 discussed with the earlier embodiments.

Figure 12:
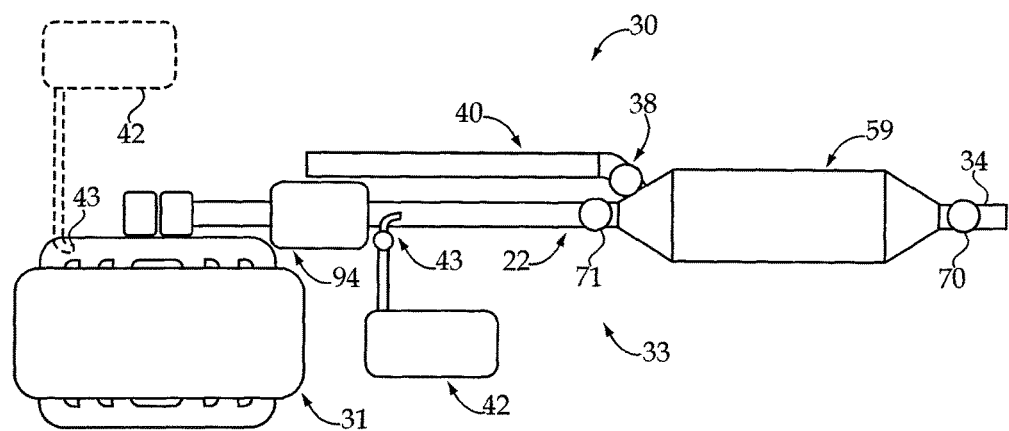
FIG. 12 is a diagrammatic illustration of another embodiment in which an exhaust energy recovery system is utilized in addition to the PNA/DOC/SCR/DPR combination.

FIG. 12 is an embodiment of a system incorporating an exhaust energy recovery system 94 in order to increase the overall thermal efficiency. The utilization of the low temperature combined PNA/DOC/PF/SCR 59 or a low temperature vanadium pentoxide reduces the maximum temperature that the exhaust energy recovery system will be subjected to by removing the requirement of thermal regeneration, this improves reliability and durability while decreasing the cost of the materials required for the aftertreatment system 33. Additionally, the temperature at PNADOC/PF/SCR 59 will reduce or remove the need for active or passive cooling of the exhaust gases prior to entering the at the PNADOC/PF/SCR 59. The exhaust energy recovery system 94 may require the PNADOC/PF/SCR 59 to have additional PNA NOx storage capabilities due to the upstream thermal mass of the exhaust energy recovery system's heat exchangers or thermoelectric mass. While PNA/DOC/PF/SCR 59 is shown, there would be no reason why any combination of aftertreatment residing on the particulate filter substrate would not work depending on the application. urea injection might advantageously be located upstream of the exhaust energy recovery system 94 as shown dashed lines depending on the material compatibility and/or concerns for urea deposits fouling or corroding the heat exchanger 94.

The elimination of components without eliminating their respective functions as described above is made possible because of the lower temperature operation of the non-thermal filter regeneration system 38 along with the reduction in particulate matter allowing passive regeneration with engines due to the utilization of a passive NOx adsorber, low temperature capable sulfur tolerant SCR, and removal of EGR systems.

The addition of low temperature catalyst and passive NOx adsorbers significantly enhance the low temperature NOx effectiveness which will be of increased importance with the broader implementation of hybrid and engine start/stop technologies.

While the combination of the different catalyst and substrates is not effected by the utilization vacuum generated regeneration of FIG. 11, it should be noted that the utilization of an alternate non-thermal regeneration approach utilizing a lower then atmospheric pressure settling volume can be utilized for the regeneration of the particulate filter without departing from the present disclosure. One such system is discussed in PCT US 053456 application required to induce the reverse depression wave in different, but with equivalent NOx reduction It is now deemed apparent that there have been described multiple embodiments of an exhaust treatment systems 33 in which the particulate filter is downstream of the SCR or combined thereby better utilizing the engine exhaust heat and storing the NOx until the temperature is available for ultra-effective SCR catalyst performance with the potential for the virtual elimination of NOx emissions at the tail pipe 34. When combined, the SCR catalyst is considered to be coated on the particulate filter substrate.

INDUSTRIAL APPLICABILITY

The present disclosure finds general applicability for engine systems. The present disclosure finds specific applicability to engine systems that feature a compression ignition diesel engine and an aftertreatment system. The present disclosure also finds further applicability in engine systems that burn diesel fuel with a sulfur content in excess of 15 parts per million and higher. Finally, the present disclosure finds general applicability to any aftertreatment system that utilizes a non-thermal regeneration system to move particulate matter out of the filter and into a volume in contrast with the thermal strategies that remove particulate matter by burning the same.

Referring specifically now to the embodiments of FIGS. 2 thru 13, a method of operating an engine system 30 includes rapidly heating the SCR catalyst 37 faster than the particulate trap substrate 36 immediately after cold engine start up. This is accomplished by positioning the SCR catalyst 37 closer to engine 31 than the downstream particulate filter 36, or on the PF substrate. A reduction reaction with NOx with a reductant is catalyzed with the sulfur tolerant SCR catalyst 37. Particulate matter generated by burning diesel fuel in the compression ignition engine 31 is trapped in the particle trap 36. The particle trap 36 is regenerated non-thermally by moving particulate matter from within the particle trap 36, out through the inlet 41 of the particle trap 36, through the valve 39 and into the particulate settling volume 40, often without oxidizing the particulate matter.

In some embodiments, the exhaust temperature seen by the SCR catalyst 37 is maintained below 350° Celsius by at least one of locating the SCR catalyst 37 remotely downstream from the compression ignition diesel engine 21, by cooling the exhaust stream, and maybe by temporarily de-rating the compression ignition diesel engine 31. NOx reduction effectiveness may be improved by passing exhaust through an oversized particle trap 56 that is coated with the sulfur tolerant SCR catalyst and has a length over diameter ratio greater than one and a half. The initial occurrence of a NOx reduction reaction after engine start up may be hastened by injecting the reductant into the exhaust manifold 45 of the compression ignition diesel engine 31. Those skilled in the art will appreciate that the engine 31, because of the improved aftertreatment system 33, may be equipped with a low pressure fuel injection system with a maximum injection pressure less that 15,000 PSI. This fuel injection system may take the form of a common rail fuel injection system 67 (FIG. 2) or a pump and line fuel injection system 66 (FIG. 3) as discussed earlier. Because the SCR catalyst is a sulfur tolerant SCR catalyst, the compression ignition diesel engine 31 may burn diesel fuel with a sulfur content of at least 15 parts per million without fouling the SCR catalyst.

Unlike thermally regenerated particle traps, regenerating the non-thermal particle trap regeneration system 38 may retard the compression ignition diesel engine 31 by temporarily creating increased back pressure in the exhaust system or by creating a vacuum in the intake manifold, or both. By utilizing the engine system 30 described above, the engine system can meet current and maybe future emissions regulation at the tailpipe 34. The relevant emission regulation may be at least one of the United States Environmental Protection Agency US Tier 2 Bin 5, California Air Resources Board Lev III, or European Union Euro VI. These stringent emission regulations can be met while at the same time utilizing a lower cost lower pressure fuel injection system and a less complicated and low cost aftertreatment system 33, while also utilizing a non-thermal particle trap regeneration system 38 and diesel fuel with an increased sulfur content. Unlike thermally regenerated particle traps which require high temperatures produced by either high loads during passive regeneration or creating higher temperatures by burning fuel in the exhaust system or activating auxiliary heaters, the non-thermal regeneration system 38 of the present disclosure may be performed while the engine is idling, such as when a mobile vehicle 80 is at a stop sign or stop light, or may be done while slowing the vehicle with the non-thermal regeneration system 38 providing engine breaking due to the temporarily closure of the exhaust system by closing valve 70.

Advantages of Present Invention.

In accordance with the present invention there is provided a particulate trap regeneration system which provides one or more of the following advantages: 1—Enables low temperature SCR, with maximum temperature limit constrained catalyst, operation with an actively non-thermally regenerated Particulate Filter (PF); 2—Provides faster light off the SCR catalyst for reduced emissions during startup and low temperature urban operating conditions; 3—Reduces catalyst degradation due to the removal of elevated temperature thermal regeneration cycles; 4—Reduces Exhaust Gas Recirculation (EGR) levels with the potential to eliminate the system; 5—Improves NOx effectiveness and reduces ammonia slip for possible ammonia slip catalyst removal. 6—Allows current and future emissions regulations to be met while operating on >15 ppm sulfur fuels; 7—Lowers emissions for start/stop electric and hydraulic hybrid vehicles; 8—Improves overall thermal efficiency; 9—Allows for oversized length to diameter ratio SCR catalyzed particulate filters for improved NOx effectiveness, simplified controls, and low ammonia slip; 10—Allows older engine designs to meet current emissions regulations; 11—Allows retrofitting of legacy engines with the potential of meeting current emissions regulations; 12—Reduces or eliminates tailpipe out emissions increases during PF regeneration allowing more advanced timing during normal operating conditions and subsequent improvement in overall thermal efficiency; 13—Further reduces cold start NOx emissions reduction, to near zero levels, by implementing a Passive NOx Adsorber, PNA ahead of the SCR substrate or the potential PNA coating of the PF on the inlet of the combined system substrate. The resultant benefits of the above are ultra-low NOx emissions during startup and urban driving; 14—Allows the utilization of exhaust energy recovery systems with the potential for >10% improvement in overall thermal efficiency while providing an active non-thermal regenerating particulate filter. Another potential advantage is maybe the ability to inject urea directly into the exhaust manifold to shorten the time between start up and effective NOx catalytic reduction. Engine system 30 of FIG. 2 may utilize a low pressure fuel injection system 65 in the form of a common rail fuel injection system 66. As used in the present disclosure a "low pressure fuel injection system" means a system with a maximum injection pressure less that 15,000 PSI.

Additional benefits of the above are that hybrid vehicles can maximize their fuel economy advantage while providing low output NOx emissions. The engine can be shut down as often as needed with reduced NOx emissions during startup.

It should be understood that the above description is intended for illustrative purposes only, and is not intended to limit the scope of the present disclosure in any way. Although the invention is defined by the claims set forth below, any permutation of those claims would also fall within the intended scope of the present disclosure. For instance, an engine system according to claim 1 combined with any combination of one or more of the dependent claims 2-11 would also fall within the intended scope of the present disclosure. For instance, an engine system that combined the features of claims 1, 2 and 5 would also fall within the intended scope of the present disclosure. Thus, in accordance with European practice, a patent claim that combined claims 1, 2 and 5, or any other permutation of claim 1 with any or any subset of the dependent claims 2-11 are explicitly taught in this disclosure, without the need to file this application with claims having multiple dependencies. Thus, those skilled in the art will appreciate that other aspects of the disclosure can be obtained from a study of the drawings, the disclosure and the appended claims.

What is claimed is:

1. An engine system comprising:
a compression ignition diesel engine with an exhaust outlet fluidly connected with an aftertreatment system that terminates at a tail pipe;
a source of diesel fuel fluidly connected to the engine;
the aftertreatment system including a particle trap fluidly positioned between the engine and the tailpipe, and a SCR catalyst fluidly positioned on the particle trap or between the particle trap and the engine;
wherein the SCR catalyst is a sulfur tolerant SCR catalyst; and
a non-thermal particle trap regeneration system that includes a valve fluidly positioned between a particulate volume and an inlet of the particle trap;
a reductant system with a doser positioned to deliver a reductant into the aftertreatment system upstream from the SCR catalyst.

2. The engine system of claim 1 wherein the sulfur tolerant SCR catalyst is predominantly vanadium pentoxide.

3. The engine system of claim 1 wherein the source of diesel fuel is high sulfur has a sulfur content greater than fifteen parts per million of sulfur.

4. The engine system of claim 1 wherein the particle trap has a length over diameter ratio greater than one and a half.

5. The engine system of claim 1 wherein the particle trap and the SCR catalyst are positioned within a shared can.

6. The engine system of claim 5 wherein the SCR catalyst is coated on a substrate of the particle trap.

7. The engine system of claim 1 wherein the aftertreatment system includes a NOx adsorber positioned upstream from the SCR catalyst.

8. The engine system of claim 1 wherein the compression ignition diesel engine includes a low pressure fuel injection system with a maximum injection pressure less than 15,000 psi.

9. The engine system of claim 8 wherein the low pressure fuel injection system is one of a pump and line fuel injection system and a common rail fuel injection system.

10. The engine system of claim 1 wherein the dozer of the reductant system opens into an exhaust manifold of the compression ignition diesel engine.

11. The engine system of claim 1 wherein the compression ignition diesel engine is supported on, and operably coupled to propel, a mobile vehicle.

12. A method of operating an engine system that includes a compression ignition diesel engine with an exhaust outlet fluidly connected with an aftertreatment system that terminates at a tail pipe; a source of diesel fuel fluidly connected to the engine; the aftertreatment system including a particle trap fluidly positioned between the engine and the tailpipe, and a SCR catalyst fluidly positioned on the particle trap or between the particle trap and the engine; wherein the SCR catalyst is a sulfur tolerant catalyst; a non-thermal particle trap regeneration system that includes a valve fluidly positioned between a particulate volume and an inlet of the particle trap; and a reductant system with a dozer positioned to deliver a reductant into the aftertreatment system upstream from the SCR catalyst, the method comprising the steps of:
rapidly heating the SCR catalyst faster than the particle trap immediately after engine start up;
catalyzing a reduction reaction of NOx with the reductant with the sulfur tolerant SCR catalyst;
trapping particulate matter generated by burning diesel fuel in the compression ignition diesel engine in the particle trap;
non-thermally regenerating the particle trap by moving the particulate matter from within the particle trap, out through the inlet of the particle trap, through the valve and into the particulate settling volume.

13. The method of claim 12 including limiting an exhaust temperature seen by the SCR catalyst below 350 degrees Celsius by at least one of locating the SCR catalyst remotely downstream from the compression ignition diesel engine, cooling the exhaust stream, and temporarily de-rating the compression ignition diesel engine.

14. The method of claim 12 including improving NOx reduction effectiveness by passing exhaust through the particle trap that is coated with the SCR catalyst and has a length over diameter ratio greater than one and a half.

15. The method of claim 12 including hastening an occurrence of a NOx reduction reaction by injecting a reductant into an exhaust manifold of the compression ignition diesel engine.

16. The method of claim 12 wherein the engine is fitted with a low pressure fuel injection system with a maximum injection pressure less than 15,000 psi.

17. The method of claim 12 including supplying the compression ignition diesel engine with diesel fuel having at least fifteen parts per million of sulfur content.

18. The method of claim 12 including retarding the compression ignition diesel engine responsive to regenerating the particle trap.

19. The method of claim 12 including meeting an emissions regulation at the tail pipe; and
   the emissions regulation is at least one of the United States Environmental Protection Agency US Tier 2 Bin 5, California Air Resources Board LEV III, and European Union Euro VI.

20. The method of claim 12 wherein the step of regenerating the particle trap is performed when the compression ignition diesel engine is providing engine braking.

\* \* \* \* \*